May 12, 1925.  1,537,862

E. MOHR ET AL

MEANS FOR SECURING ANTISLIPPING ATTACHMENTS TO VEHICLE WHEELS

Filed Feb. 25, 1925

Inventors
Ernest Mohr
Frederick A. V. Timbury

Patented May 12, 1925.

1,537,862

UNITED STATES PATENT OFFICE.

ERNEST MOHR AND FREDERICK RICHARD VAUGHAN TIMBURY, OF ROMA, QUEENSLAND, AUSTRALIA.

MEANS FOR SECURING ANTISLIPPING ATTACHMENTS TO VEHICLE WHEELS.

Application filed February 25, 1925. Serial No. 11,502.

*To all whom it may concern:*

Be it known that we, ERNEST MOHR and FREDERICK RICHARD VAUGHAN TIMBURY, subjects of the King of Great Britain, residing at Roma, in the State of Queensland, Commonwealth of Australia, have invented certain new and useful Improvements in and Relating to Means for Securing Antislipping Attachments to Vehicle Wheels, of which the following is a specification.

This invention refers to improvements in and relating to means for securing anti-skid or anti-slipping attachments such as chains to wheels of motor and other vehicles and has for its general objects the provision of means which will be strong and efficient, capable of production at a low cost and which will enable anti-skid devices to be easily quickly and securely attached to and easily and quickly detached from vehicle wheels.

Briefly stated the invention comprises an improved rim or felloe bolt having means for expeditiously attaching thereto anti-skid chains or the like which are formed in sections or in an uninterrupted length and equipped with means for readily attaching same to the rim or felloe bolts or to other means on said rim or felloe.

Some practical embodiments of the invention are illustrated in the accompanying drawings whereof Figure 1 is an enlarged plan of the bolt, and Figure 2 a side elevation thereof, Figure 3 is a plan showing the preferred form of chain sections, and Figure 4 a similar view illustrating a slight modification thereof.

Figures 1, 2:
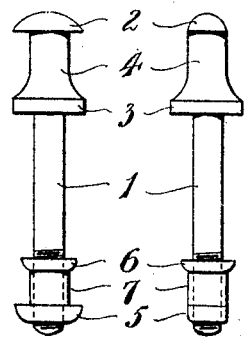

The improved bolt 1 is longer than usual and is formed at one end with a head 2 suitably shaped to act as a hook and for this purpose it may be T-shaped as illustrated in Figures 1 and 2 or L shaped and provided a short distance back from the head with a collar or shoulder 3 thus forming a groove 4 between the head and said collar or shoulder.

The nut 5 which is screwed on the threaded end of the bolt is longer than usual and hook shaped to correspond with the head end thereof with a similar T shaped projecting end 5 or L-shaped end, and a collar 6 with an intervening groove 7.

According to one arrangement the bolts 1 are passed transversely through holes in the felloe and at equal distances apart and retained by the nut and in order to prevent the bolt turning it may be formed of any cross sectional area other than circular or with grooves or projections.

Figure 5:
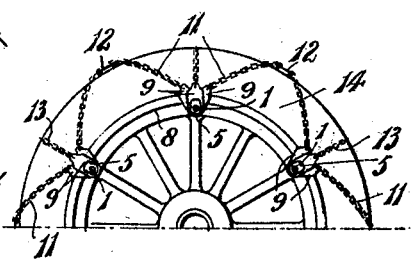
Figure 5 is a side elevation of portion of a wheel with a demountable rim and the chain sections shown in Fig. 3.
Figure 6:
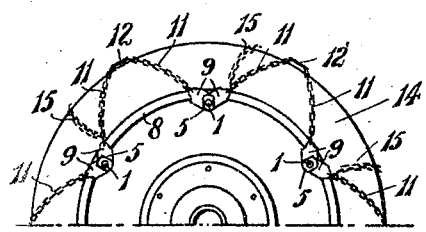
Figure 6 is a side elevation similar to Fig. 5, illustrating a further modification.

In the case of wheels which are constructed with detachable or demountable rims held in place by similar rim bolts and nuts as in Figure 5, the bolts and nuts herein referred to are designed and intended to permanently replace and serve all the purposes of the rim bolts clamped to the felloe or rim and rim bolt nuts holding the rim wedges 8 in position whilst being available for securing thereto the anti-skid device.

Where necessary in the case of disc wheels as in Figure 6, the bolts may be inserted in holes drilled through the discs and held in position by nuts or clamps.

The anti-skid chain sections are provided where required with plates 9 or the like formed with means for attaching same to the heads and nuts of the bolts. For this purpose the plates are formed with slots 10 suitably shaped in accordance with the heads and nuts of the bolt so as to pass over the heads 2 of the bolts and the ends 5 of the nuts and engage the grooves 4 and 7. The plates engaged by the nut are retained by tightening the latter and so turning same till the longest length of the T or L shaped heads are not co-incident with the correspondingly shaped slots 10 in the plates. Similarly the bolt 1 is fitted to the wheel felloe or rim so that the T or L shaped head will not be coincident with the slots in the plates when the chain sections or like anti-skid attachments are in position the object being in both cases to provide locking members integral with each bolt and nut adapted to prevent inadvertent releasement of the plates.

The invention is not to be regarded as limited to the T headed nuts and bolts and correspondingly elongated slotted plates on the chains, but this construction or the L shaped construction is found most satisfactory.

In practice the anti-skid devices are connected first to the head of the bolt then to the nut, the wheel being rotated till all connections are effected.

Figure 3:
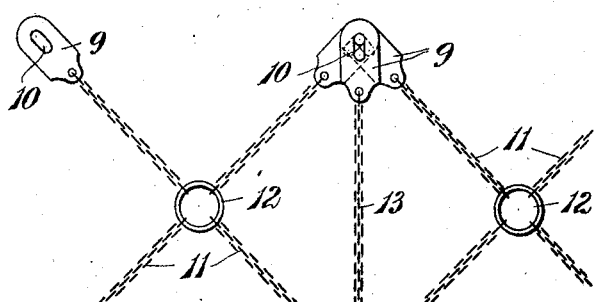

The chain sections may consist of a series of crossed chains 11 joined at the intersection by a link 12 as in Figure 3, said chains provided at the end with the connecting plates 9. With this arrangement two plates are connected to the heads and nuts of the bolts and in addition a transverse chain 13 is preferably employed and provided with plates 9 that also engages the heads and nuts.

The crossed chains are loosely fitted over the tyre 14 to enable them to prevent mud accumulating and the transverse chains are made a closer fit around the tyre and put on last and the end plates act as locks for keeping the crossed chain sections in position.

Figure 4:
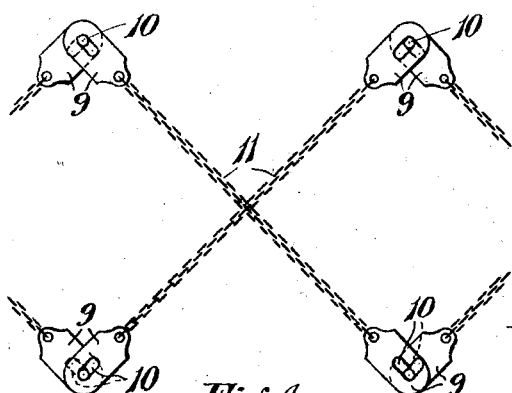

If desired the links 12 may be dispensed with as illustrated in Figure 4.

As a further modification the transverse chain 15 as in Figure 6 is connected directly with the cross chains 11 near their ends.

Figure 7:
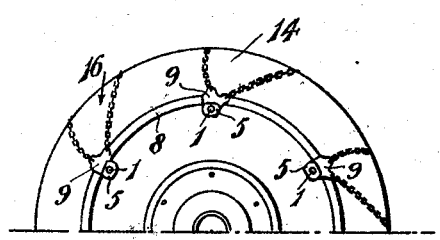
Figure 7 is a similar view to Figure 6 illustrating another modification.

According to Figure 7 a single length of chain 16 is employed and provided at intervals with slotted plates 9 or like coupling members said chain being first connected by a plate at one end to the head of a rim bolt then passed over the tyre and fixed on the nut of the same bolt then brought obliquely over to the head of the next bolt and so on till the tread is encircled when the end of the chain is secured to the first bolt.

It is to be understood that the forms of anti-skid or anti-slipping chains may be connected to the wheel by other attachment means provided on or around the rim or felloe than the bolts and by other attaching means than the slotted plates. With any of the forms of said chains some portion is always in contact with the road surface and they are of particular advantage when a wheel sinks below the surface as the amount of chain on both sides of the tyre ensure a good grip on the sides of the depression formed in the road surface.

We claim:—

1. Means for securing anti-slipping attachments to vehicle wheels, comprising a rim or felloe bolt formed with an integral locking member and provided with a nut having a hook shaped end.

2. Means for securing anti-slipping attachments to vehicle wheels, consisting of a rim or felloe bolt formed with a head, a collar and an intervening groove and provided with a nut formed with a projecting end, a collar and an intervening groove.

3. Means for securing anti-slipping attachments to vehicle wheels consisting of a rim or felloe bolt formed with a T-shaped head, a collar and an intervening groove and provided with a nut formed with a T-shaped end, a collar and an intervening groove.

4. Means for securing anti-slipping attachments to vehicle wheels comprising rim or felloe bolts each formed with a head, a collar and an intervening groove and provided with a nut formed with a projecting end, a collar and an intervening groove and chains provided with slotted plates adapted to engage the heads and nuts of the bolts.

Dated this thirty first day of December, 1924.

ERNEST MOHR.
FREDERICK RICHARD VAUGHAN TIMBURY.